United States Patent [19]

Thum

[11] Patent Number: 5,201,558
[45] Date of Patent: Apr. 13, 1993

[54] FOLD-BACK DEFORMATION ARRANGEMENT

[75] Inventor: Holger M. Thum, Brunswick, Fed. Rep. of Germany

[73] Assignee: Volkswagen AG, Wolfsburg, Fed. Rep. of Germany

[21] Appl. No.: 848,866

[22] Filed: Mar. 10, 1992

[30] Foreign Application Priority Data

Mar. 16, 1991 [DE] Fed. Rep. of Germany ....... 4108681
Aug. 21, 1991 [DE] Fed. Rep. of Germany ....... 4127652

[51] Int. Cl.⁵ ............................................. B60R 19/02
[52] U.S. Cl. ..................................... 293/133; 188/377
[58] Field of Search ................. 293/133, 132; 188/371, 188/376, 377

[56] References Cited

U.S. PATENT DOCUMENTS 3,146,014  8/1964  Kroell ................................. 293/133
3,599,757  8/1971  Takamatsu et al. ............. 293/133 X
5,074,391  12/1991  Rosenzweig ......................... 188/377

FOREIGN PATENT DOCUMENTS 1282363  11/1968  Fed. Rep. of Germany .

Primary Examiner—Robert R. Song
Attorney, Agent, or Firm—Brumbaugh, Graves, Donohue & Raymond

[57] ABSTRACT

A fold-back deformation arrangement includes a deformation tube of plastically deformable material and a support arrangement with a fold-back surface engaging one end of the tube. The arrangement is designed so that relative angular motions between the fold-back surface and the deformation tube are possible without tending to buckle the tube.

9 Claims, 9 Drawing Sheets

ID-BACK DEFORMATION ARRANGEMENT

BACKGROUND OF THE INVENTION

This invention relates to arrangements in which energy is absorbed by fold-back deformation of a deformable element.

As described in German Patent No. 12 82 363, fold-back deformation arrangements are used to slow down a motor vehicle in the event of, for example, a head-on collision, so as to prevent particularly critical deformations of the passenger compartment by providing a relatively gradual braking of the vehicle. In such fold-back deformation arrangements, kinetic energy is converted into deformation work by folding back at least one end of a deformation tube as it is forced against an appropriately shaped fold-back surface supported on a rigid stop.

A disadvantage of conventional fold-back deformation arrangements is that their components are not capable of angular motion with respect to each other in a common longitudinal plane. This shortcoming can be disadvantageous because deformation tubes only ensure selective deformation when the forces to be absorbed or converted to work are applied in the direction of the longitudinal axis of the deformation tube. When forces are directed obliquely thereto, on the other hand, there is a risk that the deformation tube will buckle, causing the deformation of the tube to have an undesirable force-displacement characteristic which first has a steep rise and then has a steep drop.

SUMMARY OF THE INVENTION

Accordingly, it is an object of the present invention to provide a fold-back deformation arrangement which overcomes the above-mentioned disadvantages of the prior art.

Another object of the invention is to provide a fold-back deformation arrangement which has a flexible and adjustable mounting adaptable to application of deforming force in different directions. A further object of the invention is to provide a support arrangement for use in fold-back deformation systems which can be acted on by forces applied at an angle to the longitudinal axis of a deformation tube.

These and other objects of the invention are attained by providing a fold-back deformation arrangement which includes a fold-back deformation member and a stop which includes a fold-back deformation surface and a support member and which provides fold-back engagement with the deformation member throughout a range of angles.

The fold-back deformation arrangement of the invention thus permits a positioning of the fold-back surface of the support member which is oblique with respect to the longitudinal axis of the fold-back deformation member, which may be in tubular form. This possibility of oblique positioning is obtained in advantageous fashion very simply and requires no significant additional space. In this connection, it should be noted that the obliquely positionable fold-back deformation arrangement includes one end of a deformation tube and an associated support member which are utilized for selective fold-back deformation of the deformation tube.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
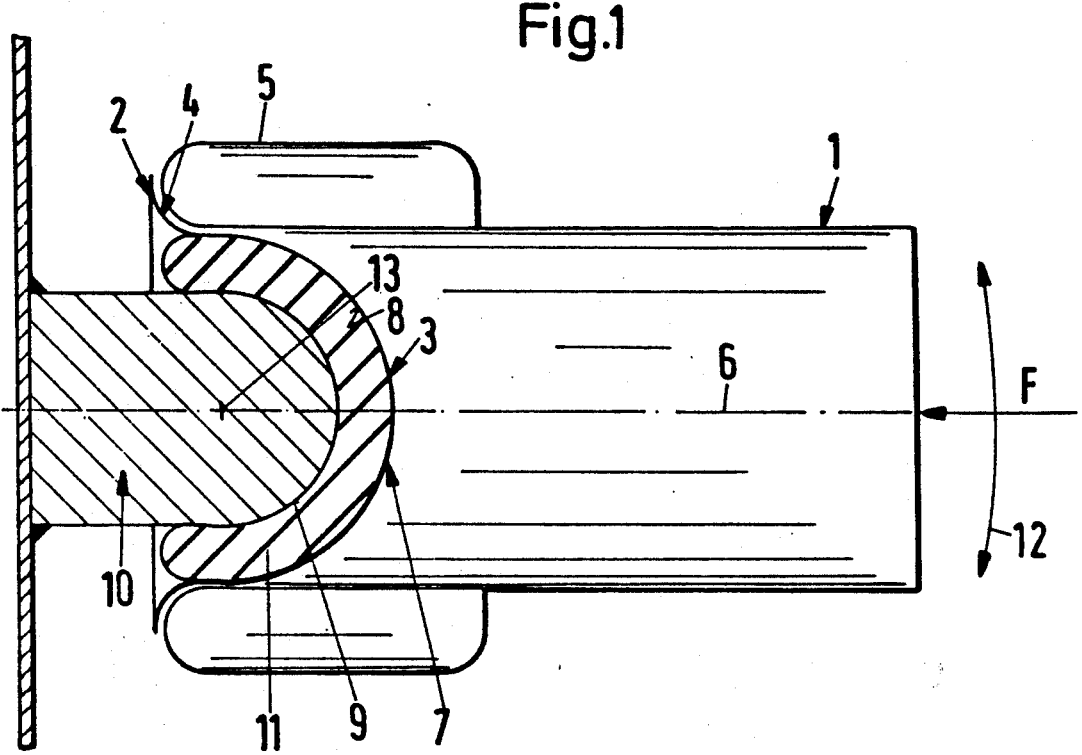
FIGS. 1 and 2 are longitudinal sectional views illustrating representative fold-back deformation arrangements in accordance with the invention utilizing support members having spherical convex and concave fold-back surfaces, respectively.

As used in the drawings, the letter F represents a force applied to the illustrated structure in the direction indicated by the arrow tending to cause fold-back deformation of the illustrated deformation tube along its axis, as occurs, for example, in the crash of a motor vehicle.

In the typical embodiment shown in FIG. 1, a deformation tube 1, consisting of a plastically deformable material, is supported with its left end, as viewed in the drawing, against a stop assembly 2 provided with a fold-back surface 3 which has a spherical configuration and terminates in an outwardly projecting edge surface 4. The surfaces 3 and 4 are symmetrical about the axis 6 of the deformation tube and are shaped to fold back the adjacent region of the deformation tube 1 as it is forced against the stop assembly 2 by enlarging the diameter of the end of the tube to produce a fold-back portion 5 of larger diameter surrounding the tube.

To adjust the direction of the axis 6 of the deformation tube 1 to the direction of the applied force F, a stop member 7 which is shaped with the fold-back surfaces 3 and 4 in this embodiment has a concave inner supporting surface 8 which surrounds a spherical surface 9 of a rigid supporting part 10 in spaced relation thereto. In this case, the stop member 7 is made of a drawn rigid sheet-metal part.

The space between the stop member 7 and the rigid support 10 is filled by a resilient intermediate layer 11 of a rubber material, which permits angular motion of the deformation tube 1 as illustrated by the arrows 12 about any axis 13 extending transverse to the longitudinal axis 6 of the tube and passing through the center of curvature of the surface 8 of the stop member 7 without causing the deformation tube 1 to be loaded to the point of buckling. The location of the axis of angular motion 13 within the tube 1, i.e., to the right of the edge surface 4 as seen in FIG. 1 promotes operational stability of the fold-back arrangement.

Figure 2:
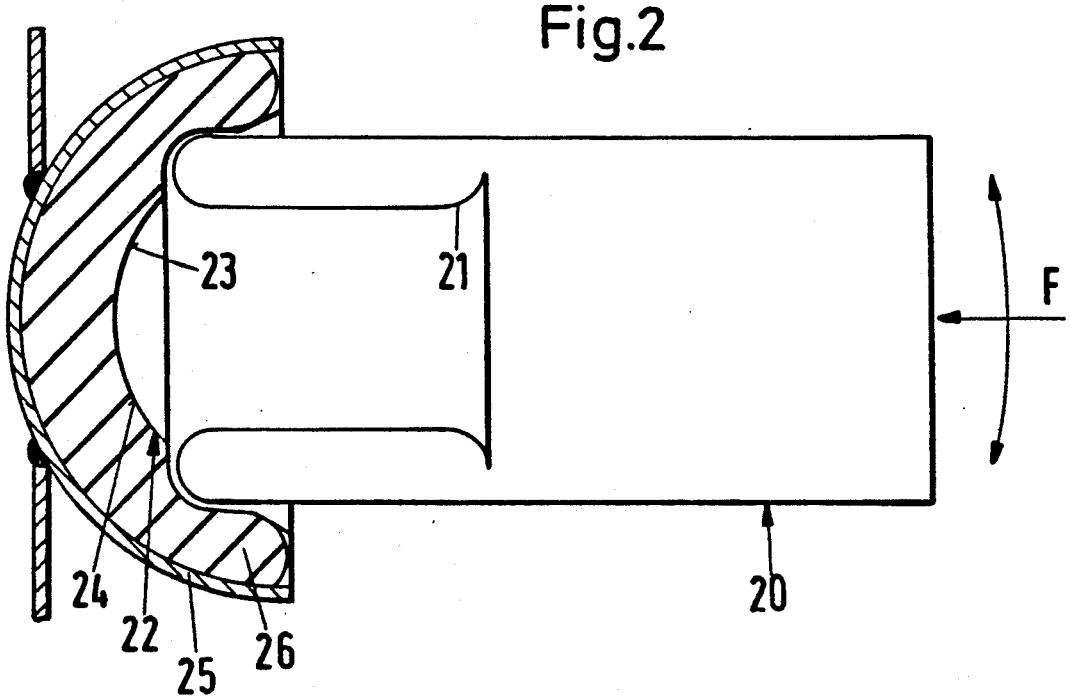

The same advantages are provided by the embodiment shown in FIG. 2, which differs from that of FIG. 1 in that a deformation tube 20 is deformed by being turned back inwardly to produce an interior fold-back portion 21. For this purpose, a stop member 22 is formed with a concave fold-back surface 23 and a convex support surface 24, which is surrounded in spaced relation by a concave supporting member 25, the intervening space being filled with a resilient intermediate layer 26.

Whereas the examples of the invention just described permit angular motion between the stop member and fold-back surfaces on the one hand and a support for them on the other hand, the additional examples described hereinafter provide alternative ways to permit angular motion of the deformation tube with respect to the fold-back stop assembly.

Figure 3:
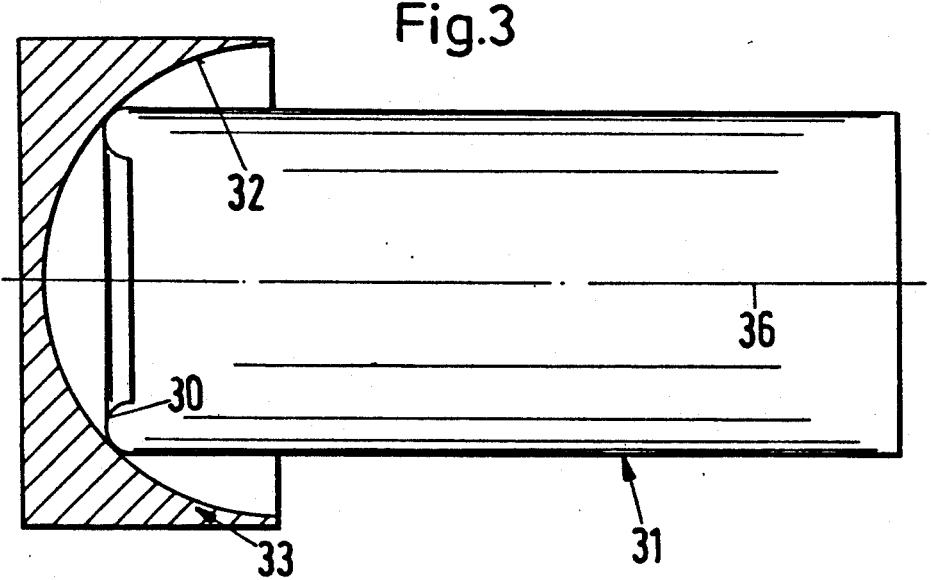
FIGS. 3, 4 and 5 are longitudinal sectional views showing a representative fold-back deformation arrangement according to the invention which has a concave fold-back surface, illustrated in different configurations.
Figure 4:
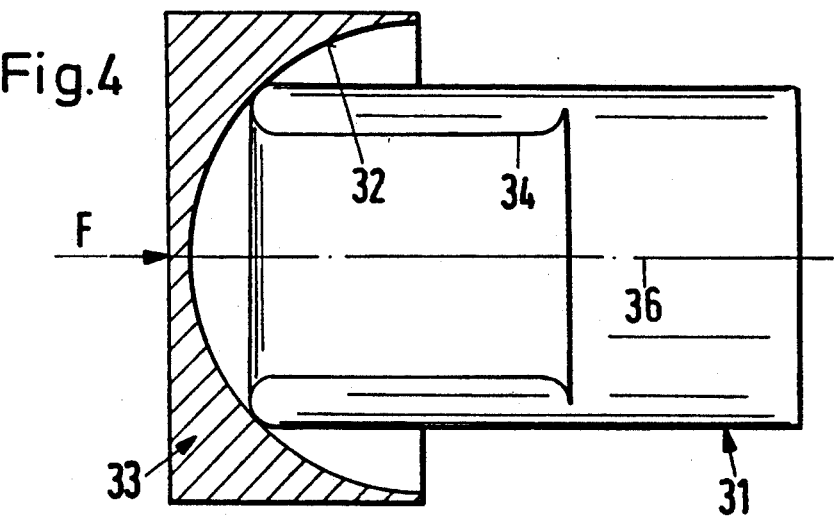
Figure 5:
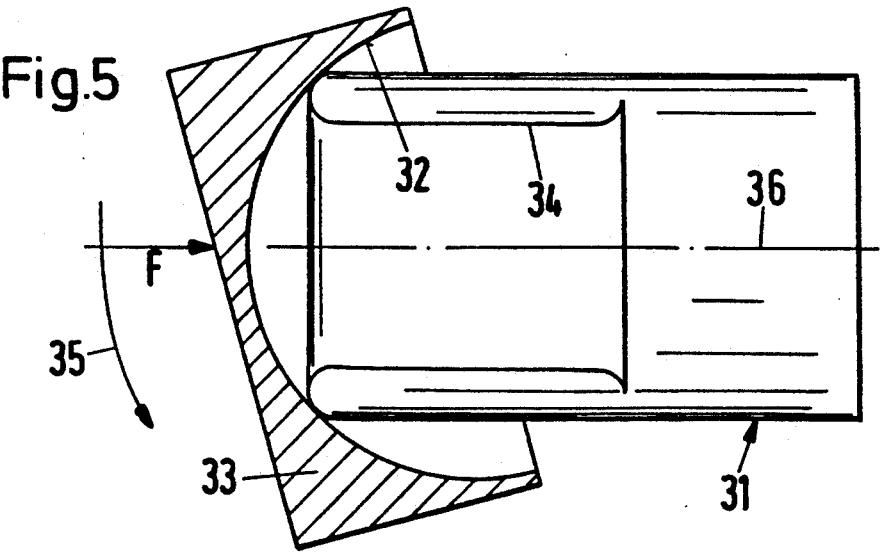

FIGS. 3, 4 and 5 show an embodiment with a deformation tube 31 having a bead 30 at the end and a concave fold-back surface 32 formed on a rigid stop 33. FIG. 3 illustrates the initial condition of the tube, i.e., prior to application of a longitudinal force F sufficient to cause fold-back. FIG. 4 shows a partial fold-back of the deformation tube 31 following application of a force F. A sizable fold-back portion 34, in this case folded back within the interior of the tube, is illustrated.

If, as a result of assembly of the deformation element or else application of a transverse force in the direction of the arrow 35 in FIG. 5, an angular motion of the stop 33 relative to the longitudinal axis 36 of the deformation tube 31 occurs, this has no effect on deformation of the tube. This result is obtained because a force component acting on the deformation tube 31 is applied in the direction of its longitudinal axis 36 in every angular orientation of the tube because of the shape of the fold-back surface 32 engaging the end of the tube, which is symmetrical about the tube axis.

This is of particular importance if the stop 33 is a component of a rigid bumper support extending in the plane of the drawing which is deformed by a crash so that it is inclined as illustrated in FIG. 5. The articulated connection between the stop 33 and a longitudinal member which is joined to the deformation tube 31 protects the tube from high bending loads upon deformation of the bumper support.

Figure 6:
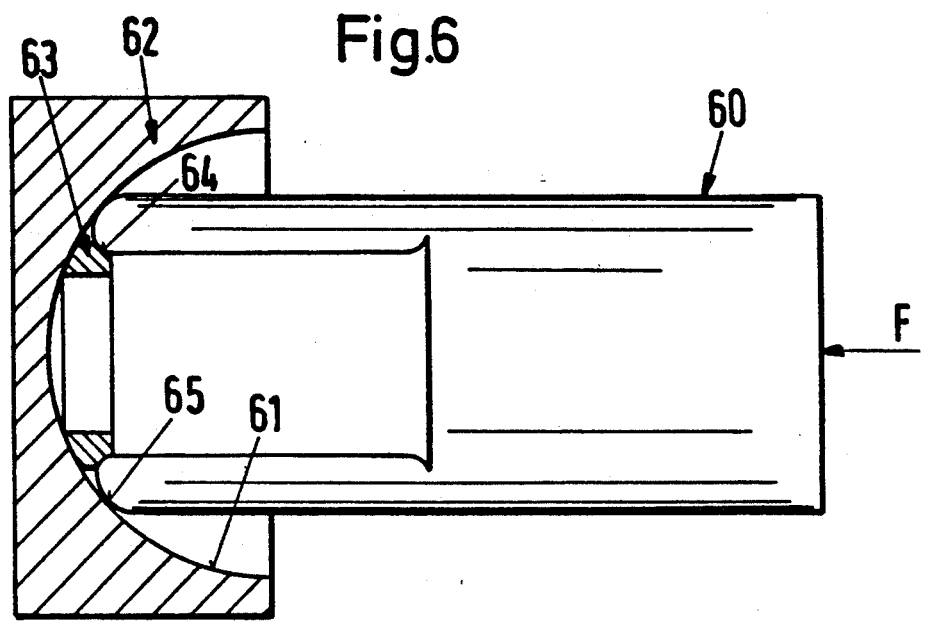
FIGS. 6 and 7 are longitudinal sectional views showing two further representative embodiments having a fold-back surface which are provided with a profile ring.

In the embodiment shown in FIG. 6, a concave fold-back surface 61 is similarly provided in a rigid stop 62 at the left end of a deformation tube 60 as seen in the drawing.

In this case, a profile ring 63, having an effective fold-back surface 64 with a considerably smaller radius than that of the fold-back surface 61 is positioned radially opposite the region of the fold-back surface 61 which produces initial fold-back of the tube in a zone 65. With this arrangement, the fold-back radius is reduced.

Thus, the provision of the profile ring 63, which is slidably supported on the main fold-back surface 61, permits a smaller fold-back radius to be generated than is possible with the arrangements shown in FIGS. 3, 4 and 5.

Figure 7:
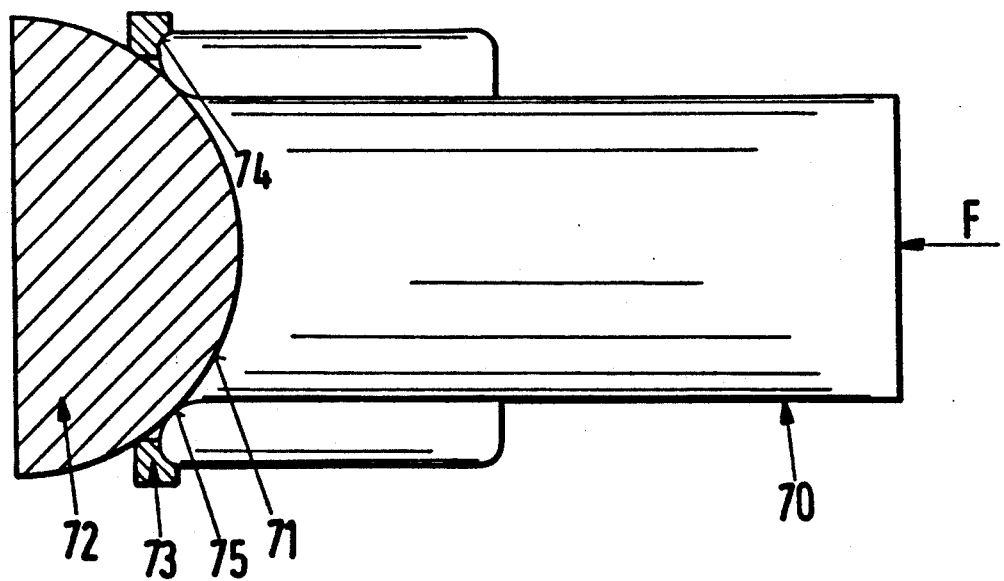

The embodiment of FIG. 7 is similar to that of FIG. 6. In this case, exterior fold-back of a deformation tube 70 is produced by a convex spherical fold-back surface 71 on a stop 72 and a profile ring 73, slidably supported thereon, having a surface 74 which is disposed approximately radially opposite a fold-back zone 75 on the surface 71.

Figure 8:
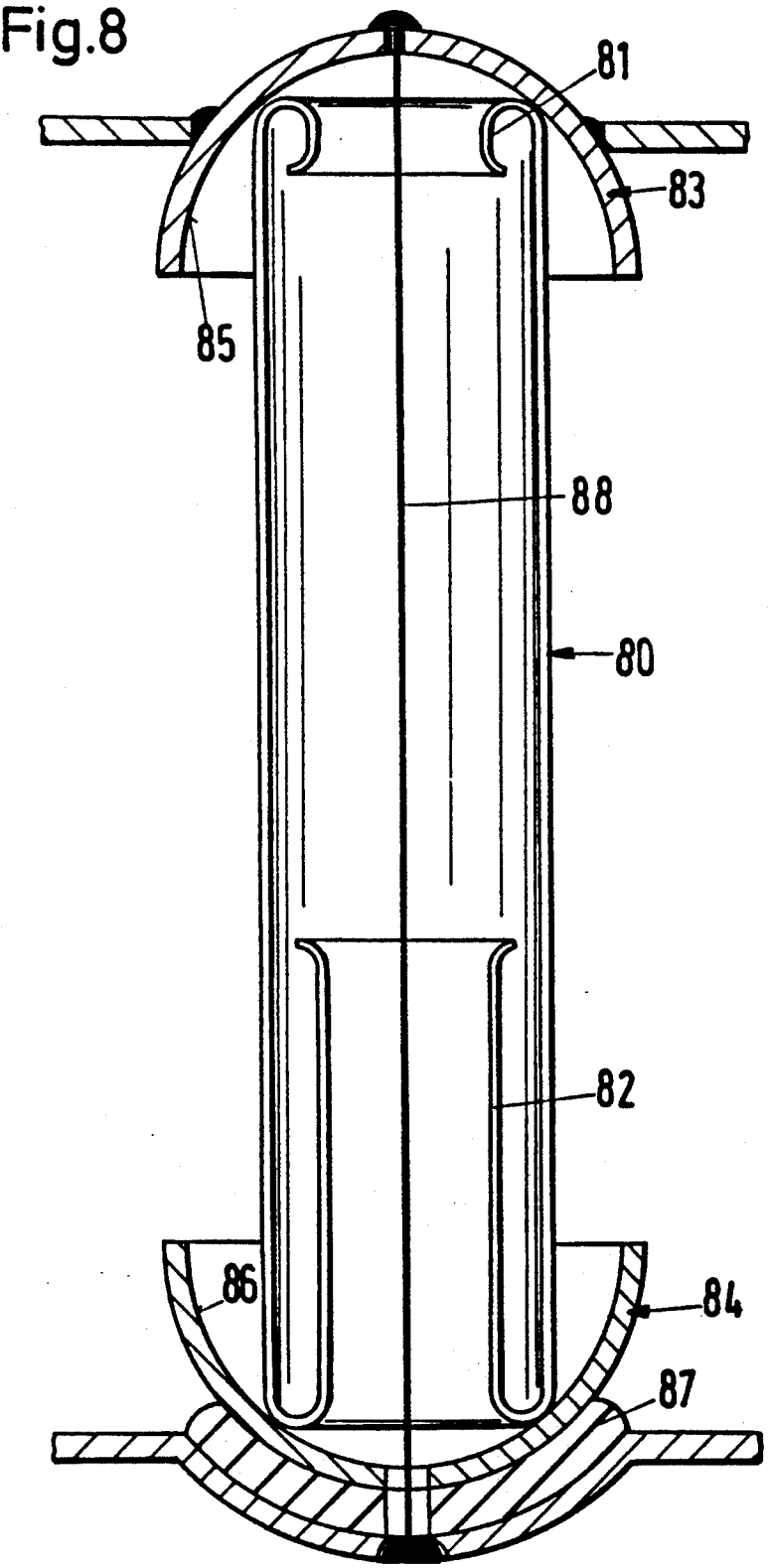
FIG. 8 is a longitudinal sectional view showing another embodiment according to the invention having fold-back surfaces at both ends of a deformation tube.

FIG. 8 illustrates the universal applicability of fold-back deformation arrangements according to the invention. In this embodiment, a deformation tube 80 has two fold-back portions 81 and 82 at opposite ends, which are both folded back within the tube 80 by a reduction of their diameter. For this purpose, two rigid stops 83 and 84 formed with concave fold-back surfaces 85 and 86 are positioned at opposite ends of the tube. While the stop 83 is rigidly supported, the support for the stop 84 is arranged in the manner described above with respect to FIG. 2 and has a resilient intermediate layer 87. Angular mobility of the deformation tube 80 is ensured by the spherical shape of the fold-back surface 86 and the resilient intermediate layer in this embodiment is for other purposes. Specifically, the components of this "articulated rod" assembly are held together by a tension cable 88, so that in this case the resilient intermediate layer 87 serves primarily to provide resilient support and bracing of the tension cable.

Figure 9:
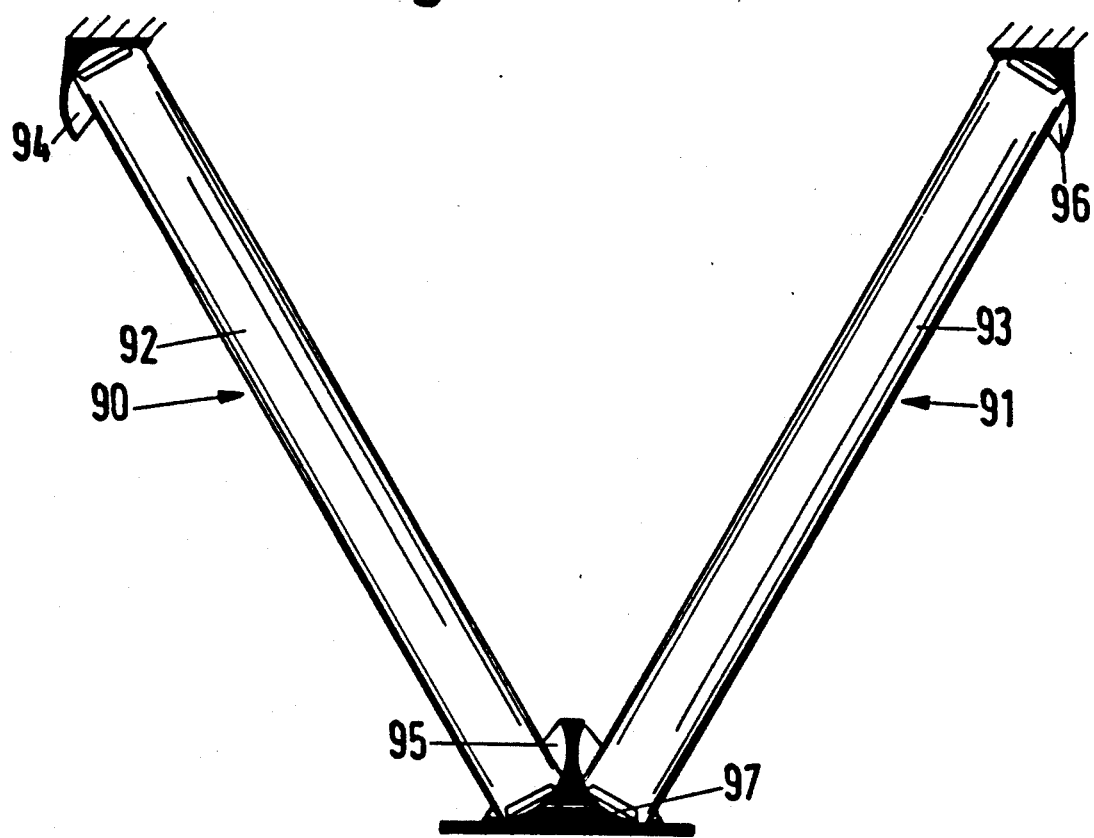
FIGS. 9 and 10 show a typical embodiment of a support arrangement having deformation elements according to the invention in different fold-back conditions.
Figure 10:
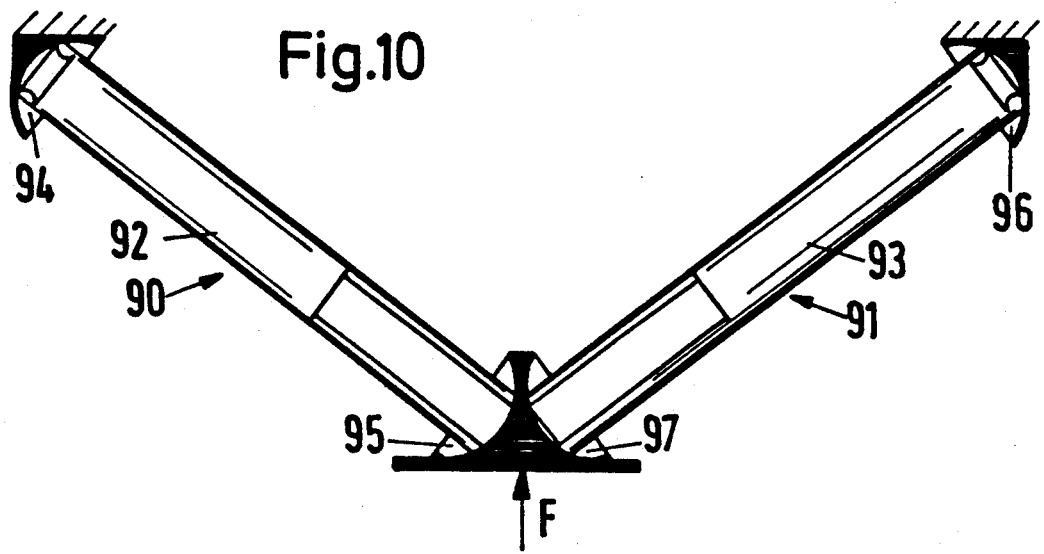

FIGS. 9 and 10 illustrate a further embodiment of the invention which provides a V-shaped support arrangement.

Referring first to FIG. 9, two deformation structures 90 and 91, of the type described with respect to FIGS. 3, 4 and 5, include two deformation tubes 92 and 93 and four concave fold-back surfaces 94, 95, 96 and 97. The deformation structures 90 and 91 are positioned as the equal sides of an approximately isosceles triangle. As shown in FIG. 10, when a critical load F is applied, the distance between the spaced ends of the tubes 92 and 93 is maintained because of the rigid assembly of the stops with the fold-back surfaces 94 and 96, but the distance between those ends and the opposite ends of the two tubes is reduced, causing an increase in the angle between the tubes 92 and 93. It will be noted that this arrangement results in a cosine-shaped force-distance characteristic because of the spherical shape of the fold-back surfaces engaging them, the deformation tubes being acted upon only by the force components applied in the direction of their longitudinal axes.

Figure 11:
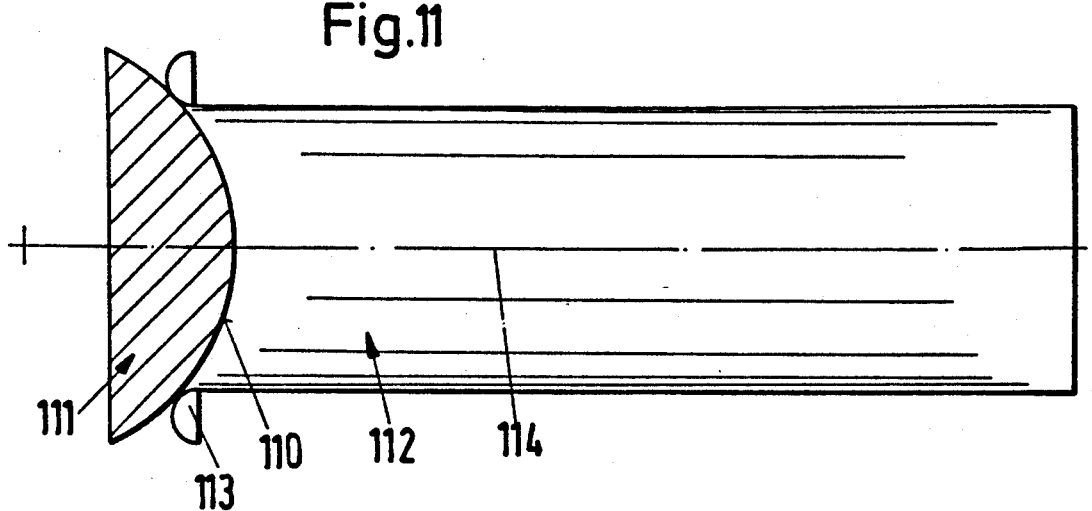
FIGS. 11, 12 and 13 are longitudinal sectional views showing an embodiment of a fold-back deformation arrangement having a support member with a convex spherical fold-back surface, in different fold-back conditions.
Figure 12:
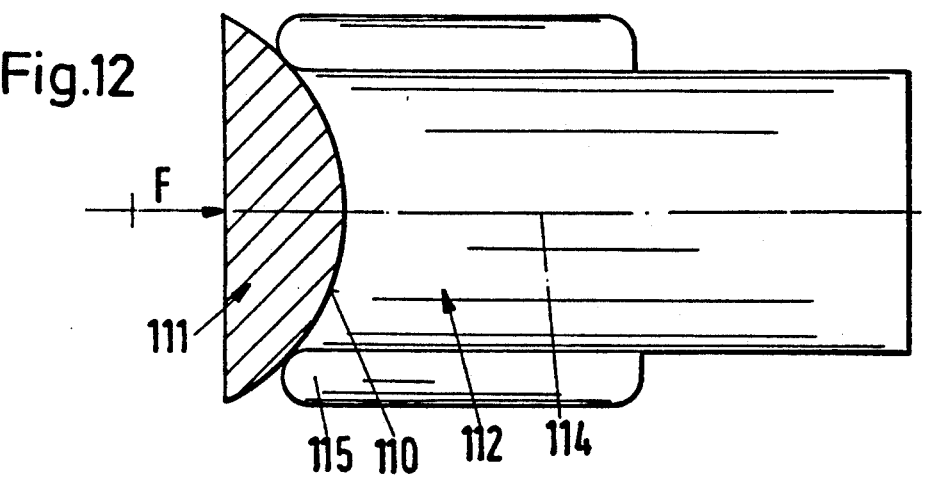
Figure 13:
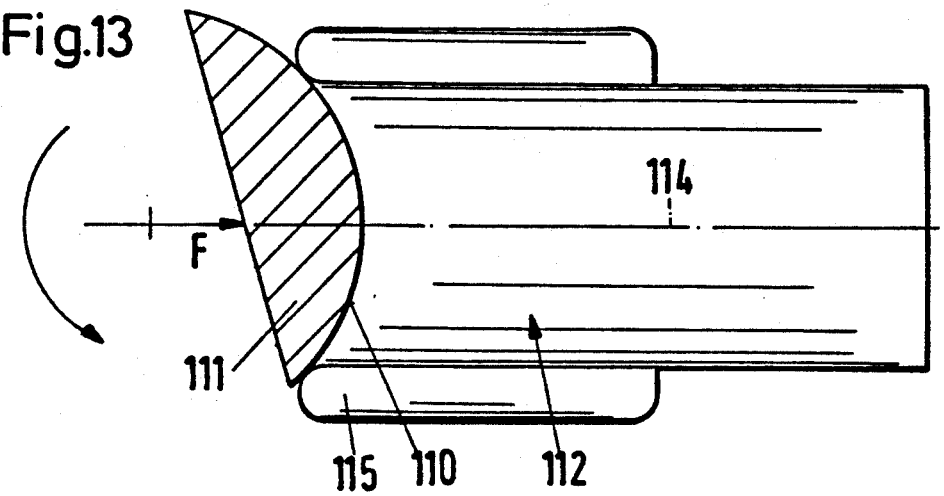

FIGS. 11, 12 and 13 further illustrate the case described with respect to FIG. 7. Here, a convex spherical fold-back surface 110 on a stop 111 engages a deformation tube 112. The tube is provided with a fold-back bead 113 which engages the fold-back surface 110 prior to application of a deforming force. As a result, when a deforming load F is applied to the fold-back surface 110 in the direction of the longitudinal axis 114 of the deformation tube 112, the diameter of the tube 112 is enlarged and the bead 113 is folded back to produce a fold-back portion 115 surrounding the tube 112. The same result is obtained when the stop 111 is turned at an angle to the longitudinal axis 114 of the deformation tube 112 due to assembly conditions or to the application of transverse forces, as shown in FIG. 13.

Figure 14:
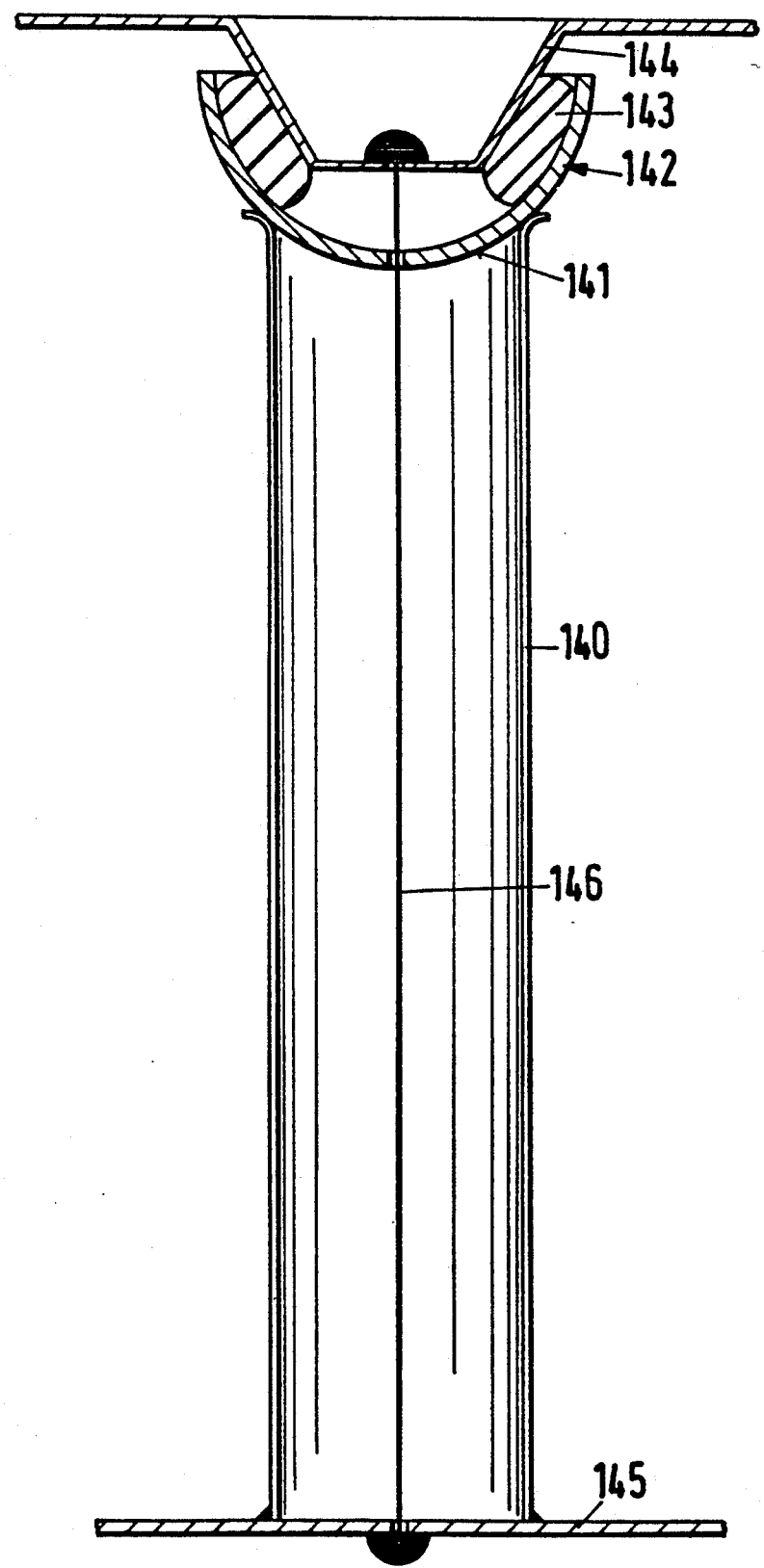
FIGS. 14 and 15 illustrate an alternative embodiment of a fold-back deformation arrangement in different fold-back conditions.
Figure 15:
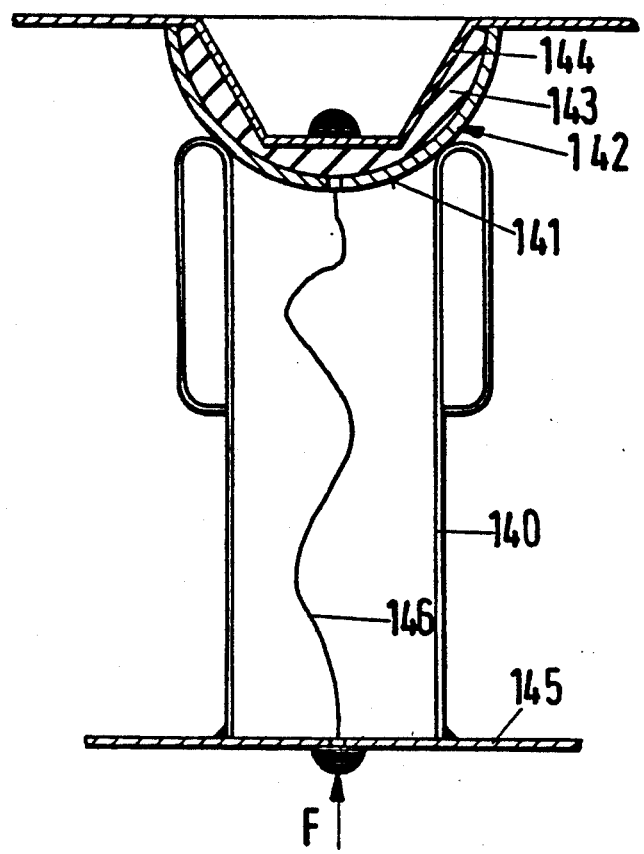

FIGS. 14 and 15 illustrate a typical deformation arrangement designed according to this principle. The upper end of a deformation tube 140 as seen in the drawings engages a spherical fold-back surface 141 supported by a rigid stop 142 which includes a rigid support part 144 and a resilient intermediate layer 143. At the lower end as seen in the drawings, the deformation tube 140 is mounted on a rigid plate 145. All of these parts are held together as a rigid unit by a tension cable 146, which is relaxed upon application of a force F which is sufficient to cause the upper end of the deformation tube 140 to be folded back as shown in FIG. 15.

Figure 16:
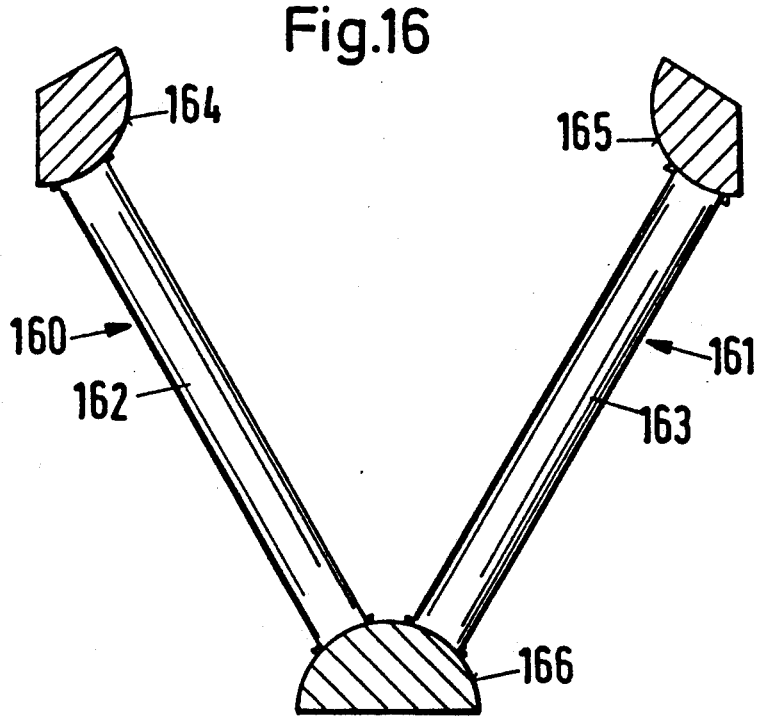
FIGS. 16 and 17 are longitudinal sectional views of another support arrangement containing deformation elements according to the invention in different fold-back conditions.
Figure 17:
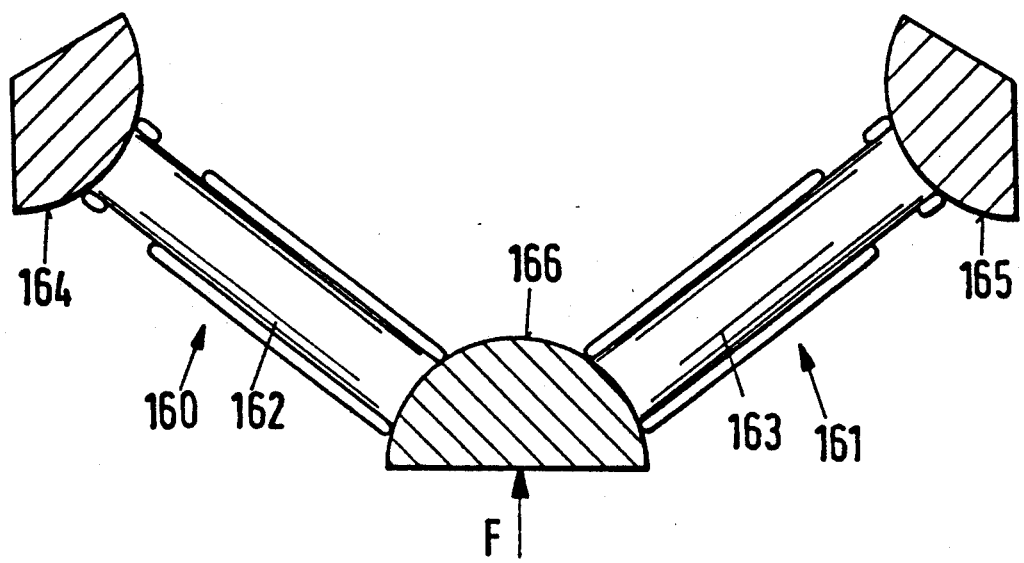

FIGS. 16 and 17 show a support arrangement, similar to that of FIGS. 9 and 10, having a V-shaped or triangular arrangement of two fold-back deformation structures 160 and 161 designed according to the invention consisting of deformation tubes 162 and 163 having beaded lips at both ends which engage corresponding spherical fold-back surfaces 164, 165 and 166.

FIG. 16 shows the configuration of the deformation tubes 162 and 163 prior to application of a deforming force whereas FIG. 17 shows the tubes 162 and 163 after they have been shortened by being folded back in response to a force F. The fact that the angle between the tubes 162 and 163 has increased is not significant with regard to the deformation process, since the deforming force component is still applied in the axial direction.

Figure 18:
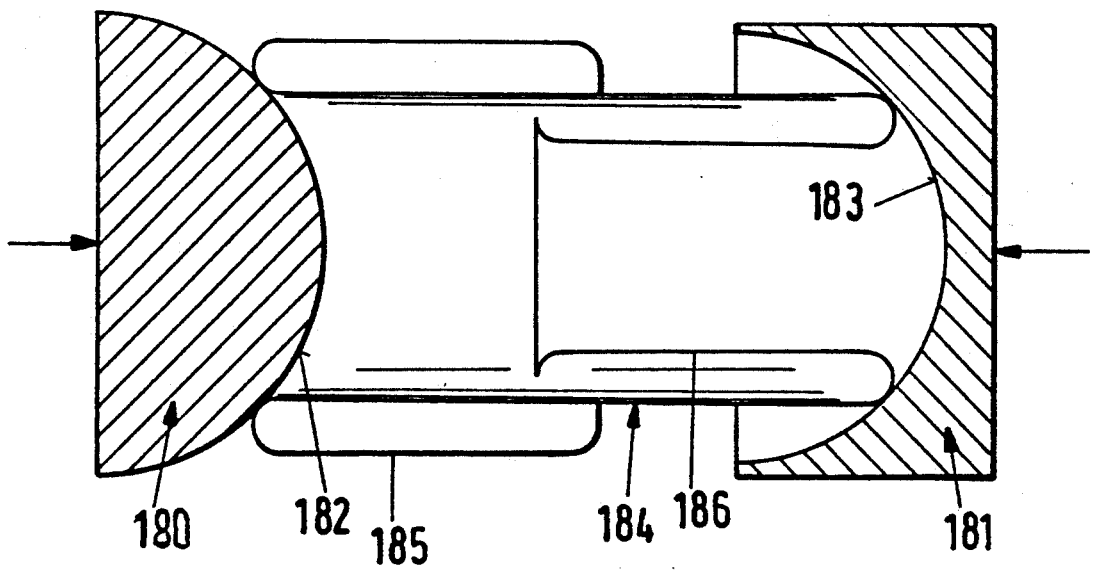
FIG. 18 is a longitudinal sectional view of a further embodiment having a fold-back arrangement at both ends.

Finally, FIG. 18 illustrates an embodiment of the invention which includes a plastic tube articulated at both ends. Two rigid stops 180 and 181, having convex and concave spherical fold-back surfaces 182 and 183, respectively, engage opposite ends of a deformation tube 184. In the illustrated condition, the ends are partially folded back to produce fold-back portions 185 and 186. The convex fold-back surface 182 folds back the portion 185 outside the tube 184, whereas the concave fold-back surface 183 folds back the portion 186 inside the tube. This arrangement assures a satisfactory deformation process even if the two stops 180 and 181 are laterally displaced parallel to one another, i.e., upward or downward as viewed in the drawing or into and out of the plane of the drawing.

The invention thus provides a deformation arrangement which is largely independent of the direction of the applied force.

Although the invention has been described herein with reference to specific embodiments, many modifications and variations therein will readily occur to those skilled in the art. Accordingly, all such variations and modifications are included within the intended scope of the invention.

I claim:

1. A fold-back deformation arrangement comprising a tubular deformation member made of plastically deformable material and stop means having a fold-back surface engaging an end of the deformation member, the stop means being shaped so that, upon application of a force to be absorbed having a component directed in the longitudinal direction of the deformation member the deformation member is continuously folded back without buckling, wherein the stop means is arranged to permit angular motion of the deformation member with respect to the stop means about a point adjacent to the stop means.

2. A fold-back deformation arrangement according to claim 1 wherein the stop means includes a resilient member.

3. A fold-back deformation arrangement according to claim 2 wherein the stop means includes a rigid support and wherein the resilient member is an intermediate layer disposed between the rigid support and the fold-back surface.

4. A fold-back deformation arrangement according to claim 1 wherein the deformation member is a tube with a beaded end projecting in the direction of fold-back and engaging the fold-back deformation surface and the fold-back surface has a spherical shape with a diameter greater than the diameter of the deformation tube.

5. A fold-back deformation arrangement according to claim 1 wherein the deformation member is a tube and including stop means at both ends of the deformation tube and tension cable means extending through the deformation tube and joining the stop means.

6. A fold-back deformation arrangement according to claim 1 wherein the deformation member is a tube and wherein the stop means includes a profile ring supported on the fold-back surface and having a surface with a smaller radius of curvature than that of the fold-back surface, the profile surface being positioned radially opposite the region of the fold-back surface at which the deformation tube is folded back.

7. A fold-back deformation arrangement according to claim 1 wherein the deformation member is a tube and including stop means at both ends of the deformation tube and wherein one of the stop means has a concave spherical fold-back surface and the other stop means has a convex spherical fold-back surface.

8. A fold-back deformation arrangement according to claim 1 including two deformation tubes disposed at an angle corresponding to the equal sides of an isosceles triangle and including stop means disposed at each end of the deformation tubes arranged to permit angular motion of the tubes with respect to the stop means.

9. A fold-back deformation arrangement according to claim 1 wherein the stop means is a component of a bending-resistant bumper support of a motor vehicle and the deformation member provides a limited articulated connection with an adjoining longitudinal member of the vehicle.

* * * * *